United States Patent
Kamen et al.

(10) Patent No.: US 7,703,074 B2
(45) Date of Patent: Apr. 20, 2010

(54) METHOD AND APPARATUS FOR TRACKING CHANGES IN A SYSTEM

(75) Inventors: Yury Kamen, Menlo Park, CA (US); Syed M. Ali, Menlo Park, CA (US); Deepak Alur, Fremont, CA (US); John P. Crupi, Bethesda, MD (US); Daniel B. Malks, Arlington, VA (US)

(73) Assignee: Oracle America, Inc., Redwood Shores, CA (US)

( * ) Notice: Subject to any disclaimer, the term of this patent is extended or adjusted under 35 U.S.C. 154(b) by 1154 days.

(21) Appl. No.: 11/133,831

(22) Filed: May 20, 2005

(65) Prior Publication Data

US 2006/0265698 A1 Nov. 23, 2006

(51) Int. Cl.
*G06F 9/44* (2006.01)
*G06F 9/45* (2006.01)

(52) U.S. Cl. .................. 717/122; 717/123; 717/128

(58) Field of Classification Search .......... 717/122–129
See application file for complete search history.

(56) References Cited

U.S. PATENT DOCUMENTS

| | | | |
|---|---|---|---|
| 5,649,200 A * | 7/1997 | Leblang et al. ............. | 717/122 |
| 5,664,173 A | 9/1997 | Fast | |
| 5,752,245 A | 5/1998 | Parrish et al. | |
| 5,911,139 A | 6/1999 | Jain et al. | |
| 5,949,999 A * | 9/1999 | Song et al. ................... | 717/127 |
| 6,023,694 A | 2/2000 | Kouchi et al. | |
| 6,071,317 A * | 6/2000 | Nagel ......................... | 717/128 |
| 6,151,700 A * | 11/2000 | Fox ............................. | 717/107 |
| 6,430,553 B1 | 8/2002 | Ferret | |
| 6,678,882 B1 * | 1/2004 | Hurley et al. ................ | 717/121 |
| 6,701,519 B1 * | 3/2004 | Cowan ........................ | 717/130 |
| 6,760,903 B1 | 7/2004 | Morshed et al. | |
| 6,772,411 B2 * | 8/2004 | Hayes et al. ................. | 717/127 |
| 6,907,546 B1 * | 6/2005 | Haswell et al. ............... | 714/38 |
| 6,934,934 B1 * | 8/2005 | Osborne et al. ............. | 717/126 |
| 6,968,540 B2 * | 11/2005 | Beck et al. ................... | 717/130 |
| 6,983,449 B2 * | 1/2006 | Newman ...................... | 717/121 |
| 7,089,530 B1 * | 8/2006 | Dardinski et al. ........... | 717/105 |
| 7,100,152 B1 * | 8/2006 | Birum et al. ................ | 717/131 |
| 7,137,100 B2 | 11/2006 | Iborra et al. | |

(Continued)

FOREIGN PATENT DOCUMENTS

GB 2 383 152 A 6/2003

OTHER PUBLICATIONS

Wang et al, "Automatic generation of systemC models from component based design for early design validation and performance analysis", ACM WOSP, pp. 139-143, 2008.*

(Continued)

*Primary Examiner*—Anil Khatri
(74) *Attorney, Agent, or Firm*—Osha • Liang LLP

(57) ABSTRACT

A method for analyzing a target system that includes obtaining a plurality of characteristics from the target system using a characteristics extractor, wherein the plurality of characteristics is associated with a characteristics model, storing each of the plurality of characteristics in a characteristics store using a tracking mechanism, and analyzing the target system by issuing a query to the characteristics store to obtain an analysis result, wherein the query uses tracking information associated with the tracking mechanism.

23 Claims, 6 Drawing Sheets

U.S. PATENT DOCUMENTS

| | | | |
|---|---|---|---|
| 7,213,113 B2* | 5/2007 | Sahin et al. | 711/162 |
| 7,383,539 B2* | 6/2008 | Bates et al. | 717/129 |
| 7,428,726 B1* | 9/2008 | Cowan et al. | 717/122 |
| 7,480,893 B2* | 1/2009 | Berenbach et al. | 717/104 |
| 2001/0042067 A1 | 11/2001 | Dayani-Fard et al. | |
| 2004/0059812 A1 | 3/2004 | Assa | |

OTHER PUBLICATIONS

McNeile et al, "Composition semantics for executable and evolvable behevioral modeling in MDA", ACM BMMDA, pp. 1-8, 2009.*

Sharma et al, "Estimation of quality for software components and empirical approach", ACM SIGSOFT, vol. 23, No. 6, pp. 1-10, 2008.*

Coulson et al, "A generic componet model for building system software", ACM Trans. on Computer Systems, vol. 26, No. 1, article 1, pp. 1-42, 2008.*

Stirewalt et al, "A component based approach to build formal analysis tools", IEEE, pp. 167-176, 2001.*

Osman et al, "An integrative semantic framework fo rimage annotation and retrieval", IEEE, pp. 366-373, 2007.*

Sugumaran et al, "Identifying software components from process requirements using domain model and object libraries", ACM ICIS, pp. 65-81, 1999.*

Prof. Victor V. Martynov, EHU; "SEMPL Semantic Patterns Language"; Summary Chapter from the book "Foundations of Semantic Coding", pp. 128-138, EHU, 2001 (9 pages).

Kamran Sartipi; "Software Architecture Recovery Based on Pattern Matching"; School of Computer Science, University of Waterloo; Proceedings of the International Conference on Software Maintenance (ICSM'03); IEEE Computer Society (4 pages).

Aldrich, et al; "Architectural Reasoning in ArchJava"; Department of Computer Science and Engineering; University of Washington; 2002; pp. 1-34.

"Structural Analysis for Java"; Mar. 1, 2004 (2 pages).

Lovatt, et al.; "A Pattern Enforcing Compiler (PEC) for Java: Using the Compiler"; Department of Computing, Macquarie University; 2005 Australian Computer Society, Inc.; (10 pages).

Hallem, et al.; "Uprooting Software Defects at the Source"; Instant Messaging, vol. 1, No. 8, Nov. 2003; pp. 1-9.

"CAST Application Intelligence Platform Empowering Application Management"; CAST The Application Intelligence Company; Oct. 2004 (2 pages).

Agitar Data Sheet; "Agitator & Management Dashboard"; Agitar Software 2003-2005; (4 pages).

Carriere et al.; "Assessing Design Quality From a Software Architectural Perspective"; OPPSLA '97 Workshop on Object-Oriented Design Quality; Oct. 5, 1997 (4 pages).

Hassan et al.; "Architecture Recovery of Web Applications"; The Guide to Computing Literature; International Conference on Software Engineering; 2002; (12 pages).

International Search Report dated Feb. 15, 2006 (3 pages).

Atkins, David L.; "Version Sensitive Editing: Change History as a Programming Tool"; System Configuration Management; ECOOP '98, SCM-8 Symposium, Proceedings 1998, Berlin, Germany; pp. 146-157, 1998 (12 pages).

International Preliminary Report dated Dec. 6, 2007 (8 pages).

International Preliminary Report dated Dec. 6, 2007 (7 pages).

PCT International Search Report dated Jan. 4, 2006 for PCT/US2005/018004 (4 pages).

PCT International Search Report dated Jan. 4, 2006 for PCT/US2005/018008 (4 pages).

PCT International Search Report dated Jan. 23, 2006 for PCT/US2005/018003 (4 pages).

Sartipi, K. et al.; "A Pattern Matching Framework for Software Architecture Recovery and Restructuring"; Proceedings IWPC'00; $8^{th}$ International Workshop on Program Comprehension, Jun. 10, 2000, pp. 1-11 (11 pages).

Lange, C. et al.; "Comparing Graph-based Program Comprehension Tools to Relational Database-based Tools"; Program Comprehension, 2001; IWPC 2001 Proceedings; $9^{th}$ International Workshop on May 12-13, 2001, Piscataway, NJ; IEEE 2001; pp. 209-218 (10 pages).

Sartipi, K. et al.; "A Graph Pattern Matching Approach to Software Architecture Recovery"; Proceedings IEEE International Conference on Software Maintenance; ICSM-2001, Florence, Italy, Nov. 7-9, 2001; pp. 408-419 (12 pages).

Jarzabek, S.; "Design of Flexible Static Program Analyzers with PQL"; IEEE Transactions on Software Engineering, IEEE Service Center, vol. 24, No. 3, Mar. 1, 1998; pp. 197-215 (19 pages).

Paul, S. et al.; "Source Code Retrieval Using Program Patterns"; Computer-Aided Software Engineering, 1992, Proceedings, Fifth International Workshop, Montreal, Quebec, Canada, Jul. 6-10, 1992; IEEE Computer Science, Jul. 6, 1992; pp. 92-105 (11 pages).

Masiero, P. et al.; "Legacy Systems Reengineering Using Software Patterns"; Computer Science Society, 1999, Proceedings SCCC '99; XIX International Conference of the Chilean Talca, Chile, Nov. 11-13, 1999; IEEE Computer Science; pp. 160-169 (10 pages).

* cited by examiner

METHOD AND APPARATUS FOR TRACKING CHANGES IN A SYSTEM

CROSS-REFERENCE TO RELATED APPLICATIONS

The present application contains subject matter that may be related to the subject matter in the following U.S. patent applications filed on May 20, 2005, and assigned to the assignee of the present application: "Method and Apparatus for Transparent Invocation of a Characteristics Extractor for Pattern-Based System Design Analysis" Ser. No. 11/134,154; "Method and Apparatus for Generating Components for Pattern-Based System Design Analysis Using a Characteristics Model" Ser. No. 11/133,717; "Method and Apparatus for Pattern-Based System Design Analysis" Ser. No. 11/134,062; "Method and Apparatus for Cross-Domain Querying in Pattern-Based System Design Analysis" Ser. No. 11/133,507; "Method and Apparatus for Pattern-Based System Design Analysis Using a Meta Model" Ser. No. 11/134,021; "Pattern Query Language" Ser. No. 11/133,660; and "Method and Apparatus for Generating a Characteristics Model for Pattern-Based System Design Analysis Using a Schema" Ser. No. 11/133,714.

BACKGROUND

As software technology has evolved, new programming languages and increased programming language functionality has been provided. The resulting software developed using this evolving software technology has become more complex. The ability to manage the quality of software applications (including design quality and architecture quality) is becoming increasingly more difficult as a direct result of the increasingly complex software. In an effort to manage the quality of software applications, several software development tools and approaches are now available to aid software developers in managing software application quality. The following is a summary of some of the types of quality management tools currently available.

One common type of quality management tool is used to analyze the source code of the software application to identify errors (or potential errors) in the source code. This type of quality management tool typically includes functionality to parse the source code written in a specific programming language (e.g., Java™, C++, etc.) to determine whether the source code satisfies one or more coding rules (i.e., rules that define how source code in the particular language should be written). Some quality management tools of the aforementioned type have been augmented to also identify various coding constructs that may result in security or reliability issues. While the aforementioned type of quality management tools corrects coding errors, it does not provide the software developer with any functionality to verify the quality of the architecture of software application.

Other quality management tools of the aforementioned type have been augmented to verify that software patterns have been properly implemented. Specifically, some quality management tools of the aforementioned type have been augmented to allow the software developer to indicate, in the source code, the type of software pattern the developer is using. Then the quality management tool verifies, during compile time, that the software pattern was used/implemented correctly.

In another implementation of the aforementioned type of quality management tools, the source code of the software is parsed and the components (e.g., classes, interfaces, etc.) extracted from the parsing are subsequently combined in a relational graph (i.e., a graph linking all (or sub-sets) of the components). In a subsequent step, the software developer generates an architectural design, and then compares the architectural design to the relational graph to determine whether the software application conforms to the architectural pattern. While the aforementioned type of quality management tool enables the software developer to view the relationships present in the software application, it does not provide the software developer with any functionality to conduct independent analysis on the extracted components.

Another common type of quality management tool includes functionality to extract facts (i.e., relationships between components (classes, interfaces, etc.) in the software) and subsequently displays the extracted facts to the software developer. While the aforementioned type of quality management tool enables the software developer to view the relationships present in the software application, it does not provide the developer with any functionality to independently query the facts or any functionality to extract information other than facts from the software application.

Another common type of quality management tool includes functionality to extract and display various statistics (e.g., number of lines of code, new artifacts added, software packages present, etc.) of the software application to the software developer. While the aforementioned type of quality management tool enables the software developer to view the current state of the software application, it does not provide the developer with any functionality to verify the quality of the architecture of the software application.

SUMMARY

In general, in one aspect, the invention relates to a method for analyzing a target system, comprising obtaining a plurality of characteristics from the target system using a characteristics extractor, wherein the plurality of characteristics is associated with a characteristics model, storing each of the plurality of characteristics in a characteristics store using a tracking mechanism, and analyzing the target system by issuing a query to the characteristics store to obtain an analysis result, wherein the query uses tracking information associated with the tracking mechanism.

In general, in one aspect, the invention relates to a system, comprising a characteristics model defining at least one artifact and a plurality of characteristics associated with the at least one artifact, a target system comprising at least one of the plurality of characteristics defined in the characteristics model, at least one characteristics extractor configured to obtain at least one of the plurality of characteristics from the target system, a characteristics store configured to store the at least one of the plurality of characteristics obtained from the target system using a tracking mechanism, and a query engine configured to analyze the target system by issuing a query to the characteristics store and configured to obtain an analysis result in response to the at least one query, wherein the query uses tracking information associated with the tracking mechanism.

In general, in one aspect, the invention relates to a computer readable medium comprising software instructions for analyzing a target system, comprising software instructions to obtain a plurality of characteristics from the target system using a characteristics extractor, wherein the plurality of characteristics is associated with a characteristics model, store each of the plurality of characteristics in a characteristics store using a tracking mechanism, and analyze the target system by issuing a query to the characteristics store to obtain an analysis result, wherein the query uses tracking information associated with the tracking mechanism.

Other aspects of the invention will be apparent from the following description and the appended claims.

DETAILED DESCRIPTION

Figure 1:
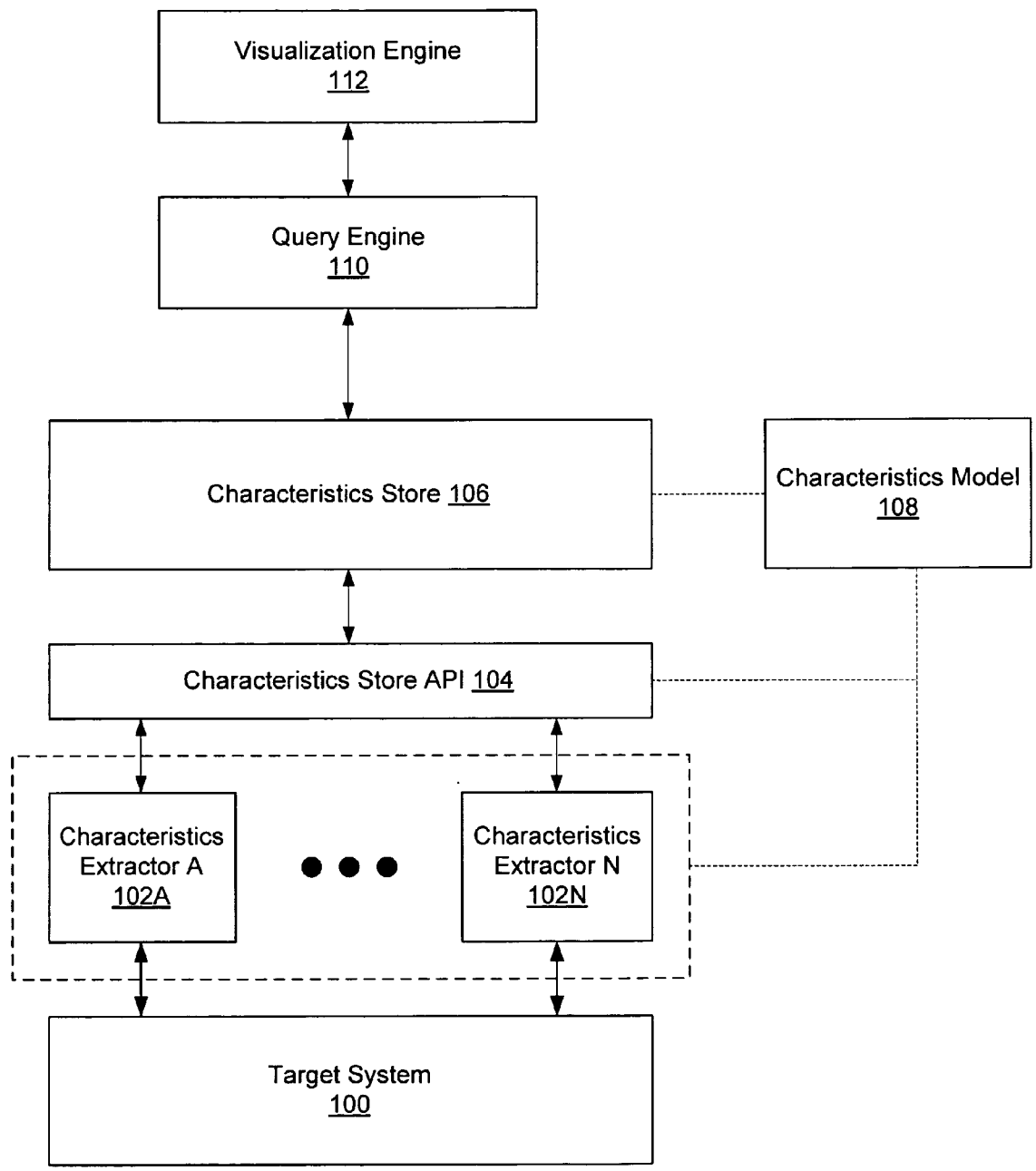
FIG. 1 shows a system in accordance with one embodiment of the invention.

Exemplary embodiments of the invention will be described with reference to the accompanying drawings. Like items in the drawings are shown with the same reference numbers.

In the exemplary embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for pattern-based system design analysis. More specifically, embodiments of the invention provide a method and apparatus for using one or more characteristics models, one or more characteristics extractors, and a query engine configured to query the characteristics of a target system to analyze the system design. Embodiments of the invention provide the software developer with a fully configurable architectural quality management tool that enables the software developer to extract information about the characteristics of the various artifacts in the target system, and then issue queries to determine specific details about the various artifacts including, but not limited to, information such as: number of artifacts of the specific type present in the target system, relationships between the various artifacts in the target system, the interaction of the various artifacts within the target system, the patterns that are used within the target system, etc.

Further, embodiments of the invention provide a method and apparatus for tracking changes in a target system. More specifically, embodiments of the invention provide tracking mechanisms to track changes in the target system. The changes in the target system may include, but are not limited to, adding/removing/modifying artifacts from the target system, adding/removing/modifying characteristics within the target system, and adding/removing/modifying relationships within the system, etc.

FIG. 1 shows a system in accordance with one embodiment of the invention. The system includes a target system (100) (i.e., the system that is to be analyzed) and a number of components used in the analysis of the target system. In one embodiment of the invention, the target system (100) may correspond to a system that includes software, hardware, or a combination of software and hardware. More specifically, embodiments of the invention enable a user to analyze specific portions of a system or the entire system. Further, embodiments of the invention enable a user to analyze the target system with respect to a specific domain (discussed below). Accordingly, the target system (100) may correspond to any system under analysis, where the system may correspond to the entire system including software and hardware, or only a portion of the system (e.g., only the hardware portion, only the software portion, a sub-set of the hardware or software portion, or any combination thereof). As shown in FIG. 1, the system includes the following components to aid in the analysis of the target system: one or more characteristics extractors (e.g., characteristics extractor A (102A), characteristics extractor N (102N)), a characteristics store application programming interface (API) (104), a characteristics store (106), a characteristics model (108), a query engine (110), and visualization engine (112). Each of these components is described below.

Figure 4:
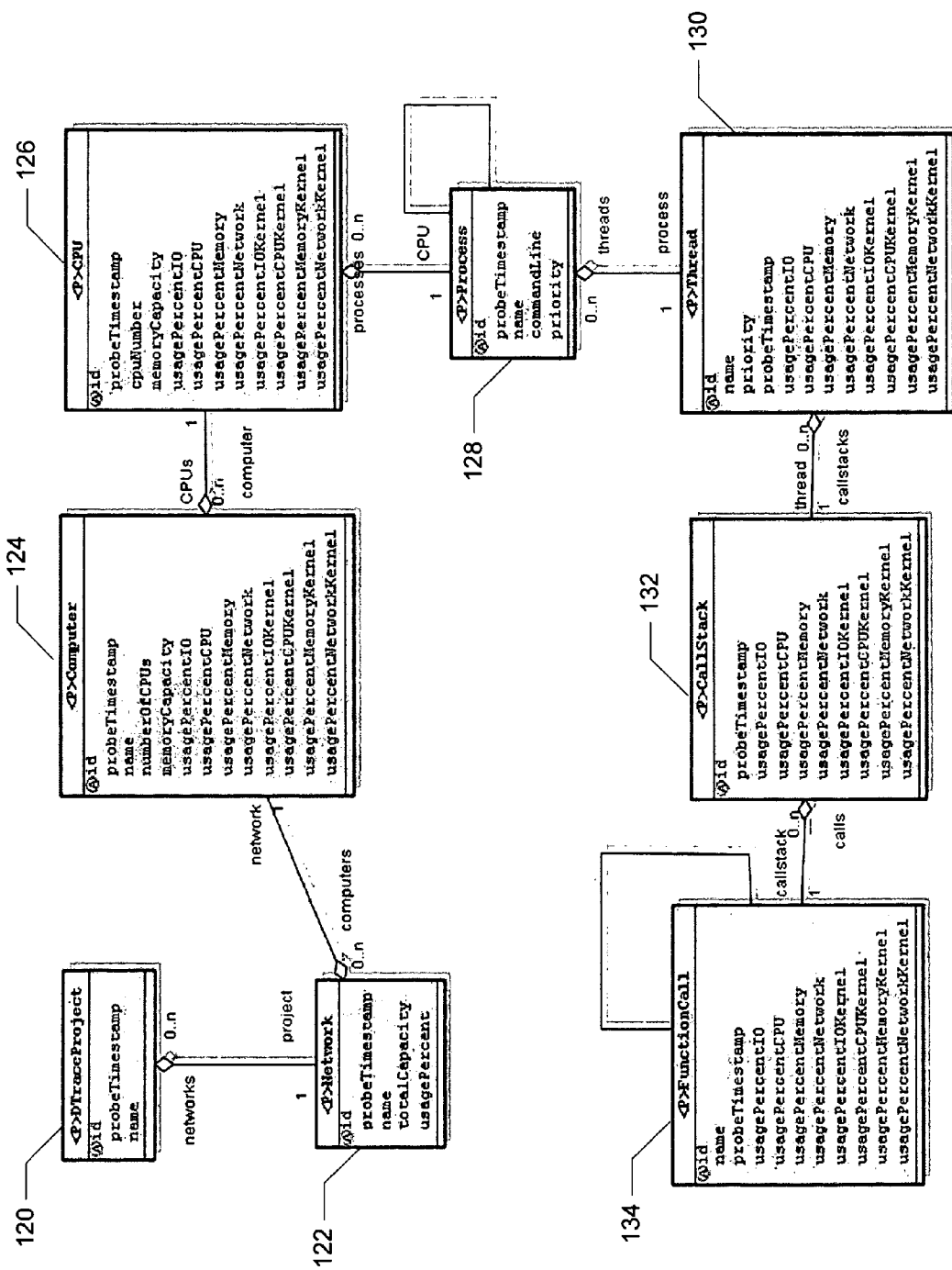
FIG. 4 shows a characteristics model in accordance one embodiment of the invention.

In one embodiment of the system, the characteristics model (108) describes artifacts (i.e., discrete components) in a particular domain. In one embodiment of the invention, the domain corresponds to any grouping of "related artifacts" (i.e., there is a relationship between the artifacts). Examples of domains include, but are not limited to, a Java™ 2 Enterprise Edition (J2EE) domain (which includes artifacts such as servlets, filters, welcome file, error page, etc.), a networking domain (which includes artifacts such as web server, domain name server, network interface cards, etc), and a DTrace domain (described below). In one embodiment of the invention, each characteristics model includes one or more artifacts, one or more relationships describing the interaction between the various artifacts, and one or more characteristics that describe various features of the artifact. An example of a characteristics model (108) is shown in FIG. 4. Those skilled in the art will appreciate that the system may include more than one characteristics model (108).

In one embodiment of the invention, the use of a characteristics model (108) enables a user to analyze the target system (100) with respect to a specific domain. Further, the use of multiple characteristics models allows the user to analyze the target system (100) across multiple domains. In addition, the use of multiple characteristics models allows the user to analyze the interaction between various domains on the target system (100).

In one embodiment of the invention, the characteristics extractors (e.g., characteristics extractor A (102A), characteristics extractor N (102N)) are used to obtain information about various artifacts (i.e., characteristics) defined in the characteristics model (108). In one embodiment of the invention, the characteristics extractors (characteristics extractor A (102A), characteristics extractor B (102N)) are generated manually using the characteristics model (108).

In one embodiment of the invention, the characteristics extractor (e.g., characteristics extractor A (102A), characteristics extractor B (102N)) corresponds to an agent loaded on the target system (100) that is configured to monitor and obtain information about the artifacts in the target system (100). Alternatively, the characteristics extractor (e.g., characteristics extractor A (102A), characteristics extractor B (102N)) may correspond to an interface that allows a user to manually input information about one or more artifacts in the target system (100). In another embodiment of the invention, the characteristics extractor (e.g., characteristics extractor A (102A), characteristics extractor B (102N)) may correspond to a process (or system) configured to obtain information about one or more artifacts in the target system (100) by monitoring network traffic received by and sent from the target system (100). In another embodiment of the invention, the characteristics extractor (e.g., characteristics extractor A (102A), characteristics extractor B (102N)) may correspond to a process (or system) configured to obtain information about one or more artifacts in the target system (100) by sending requests (e.g., pinging, etc.) for specific pieces of information about artifacts in the target system (100) to the target system (100), or alternatively, sending requests to the target system and then extracting information about the artifacts from the responses received from target system (100). Those skilled in the art will appreciate that different types of characteristics extractors may be used to obtain information about artifacts in the target system (100).

Those skilled in the art will appreciate that each characteristics extractor (or set of characteristics extractors) is associated with a particular characteristics model (108). Thus, each characteristics extractor typically only retrieves information about artifacts described in the characteristics model with which the characteristics extractor is associated. Furthermore, if there are multiple characteristics models in the system, then each characteristics model may be associated with one or more characteristics extractors.

The information about the various artifacts in the target system (100) obtained by the aforementioned characteristics extractors (e.g., characteristics extractor A (102A), characteristics extractor N (102N)) is stored in the characteristics store (106) via the characteristic store API (104). In one embodiment of the invention, characteristics store API (104) provides an interface between the various characteristics extractors (characteristics extractor A (102A), characteristics extractor N (102N)) and the characteristics store (106). Further, the characteristics store API (104) includes information about where in the characteristics store (106) each characteristic obtained from the target system (100) should be stored.

In one embodiment of the invention, the characteristics store (106) corresponds to any storage that includes functionality to store characteristics in a manner that allows the characteristics to be queried. In one embodiment of the invention, the characteristics store (106) may correspond to a persistent storage device (e.g., hard disk, etc). In one embodiment of the invention, the characteristics store (106) corresponds to a relational database that may be queried using a query language such as Structure Query Language (SQL). Those skilled in the art will appreciate that any query language may be used. In one embodiment of the invention, if the characteristics store (106) is a relational database, then the characteristics store (106) includes a schema associated with the characteristics model (108) that is used to store the characteristics associated with the particular characteristics model (108). Those skilled in the art will appreciate that, if there are multiple characteristics models, then each characteristics model (108) may be associated with a separate schema.

In one embodiment of the invention, if the characteristics store (106) is a relational database that includes a schema associated with the characteristics model (108), then the characteristics store API (104) includes the necessary information to place characteristics obtained from target system (100) in the appropriate location in the characteristics store (106) using the schema.

In one embodiment of the invention, the query engine (110) is configured to issue queries to the characteristics store (106). In one embodiment of the invention, the queries issued by the query engine (110) enable a user (e.g., a system developer, etc.) to analyze the target system (100). In particular, in one embodiment of the invention, the query engine (110) is configured to enable the user to analyze the presence of specific patterns in the target system as well as the interaction between various patterns in the target system.

In one embodiment of the invention, the query engine (110) includes functionality to issue queries using a tracking mechanism. More specifically, the query engine (110) includes functionality to issue a query to the characteristics store (106) that includes tracking information associated with the tracking mechanism. More specifically, the query engine (110) allows a user to determine changes in the system over-time by issuing queries that leverage tracking information associated with the tracking mechanism(s) used to store the characteristics in the characteristics store (106). Examples of such queries are discussed below.

In one embodiment of the invention, a pattern corresponds to a framework that defines how specific components in the target system (100) should be configured (e.g., what types of information each component should manage, what interfaces should each component expose), and how the specific components should communicate with each other (e.g., what data should be communicated to other components, etc.). Patterns are typically used to address a specific problem in a specific context (i.e., the software/system environment in which the problem arises). Said another way, patterns may correspond to a software architectural solution that incorporates best practices to solve a specific problem in a specific context.

Continuing with the discussion of FIG. 1, the query engine (110) may also be configured to issue queries about interaction of specific patterns with components that do not belong to a specific pattern. Further, the query engine (110) may be configured to issue queries about the interaction of components that do not belong to any patterns.

In one embodiment of the invention, the query engine (110) may include pre-specified queries and/or enable to the user to specify custom queries. In one embodiment of the invention, both the pre-specified queries and the custom queries are used to identify the presence of one or more patterns and/or the presence of components that do not belong to a pattern in the target system (100). In one embodiment of the invention, the pre-specified queries and the custom queries are specified using a Pattern Query Language (PQL). In one embodiment of the invention, PQL enables the user to query the artifacts and characteristics of the artifacts stored in the characteristics store (106) to determine the presence of a specific pattern, specific components of a specific pattern, and/or other components that are not part of a pattern, within the target system (100).

In one embodiment of the invention, the query engine (110) may include information (or have access to information) about the characteristics model (108) that includes the artifact and/or characteristics being queried. Said another way, if the query engine (110) is issuing a query about a specific artifact, then the query engine (110) includes information (or has access to information) about the characteristics model to which the artifact belongs. Those skilled in the art will appreciate that the query engine (110) only requires information about the particular characteristics model (108) to the extent the information is required to issue the query to the characteristics store (106).

Those skilled in the art will appreciate that the query engine (110) may include functionality to translate PQL queries (i.e., queries written in PQL) into queries written in a query language understood by the characteristics store (106) (e.g., SQL). Thus, a query written in PQL may be translated into an SQL query prior to being issued to the characteristics store (106). In this manner, the user only needs to understand the artifacts and/or characteristics that the user wishes to search for and how to express the particular search using PQL. The user does not need to be concerned with how the PQL query is handled by the characteristics store (106).

Further, in one or more embodiments of the invention, PQL queries may be embedded in a programming language such as Java™, Groovy, or any other programming language capable of embedding PQL queries. Thus, a user may embed one or more PQL queries into a program written in one of the aforementioned programming languages. Upon execution, the program issues one or more PQL queries embedded within the program and subsequently receives and processes the results prior to displaying them to the user. Those skilled in the art will appreciate that the processing of the results is performed using functionality of the programming language in which the PQL queries are embedded.

In one embodiment of the invention, the results of the individual PQL queries may be displayed using the visualization engine (112). In one embodiment of the invention, the visualization engine (112) is configured to output the results of the queries on a display device (i.e., monitor, printer, projector, etc.).

In one embodiment of the invention, the system may include tracking mechanisms to tracking changes in the target system. More specifically, the system includes functionality to use a tracking mechanism to store characteristics within the system. In one embodiment of the invention, the tracking mechanism corresponds to associating each characteristic stored in the characteristics store (106) with a time-related attribute. (See FIG. 2) Alternatively, the tracking mechanism corresponds to using sub-characteristics stores to store characteristics associated with an instance of the target system (e.g., a particular version, the target system at a given time, etc.). (See FIG. 3).

In one embodiment of the invention, the query engine (110) is configured to issue queries to the characteristics store (106) using tracking information associated with the tracking mechanisms used to the store the characteristics within the characteristics store (106). For example, if the characteristics are stored with a time-related attribute, then the query engine may issue queries that specify a particular timeframe, version, etc. Thus, only characteristics that have a time-related attributed within the range specified by the query are considered. Alternatively, if sub-characteristics stores are used, then the query may specify a particular sub-characteristics store (e.g., queries that specify the name of the particular sub-characteristics store) within the characteristics store (106) to issue the queries to.

Figure 2:
FIG. 2 shows a characteristic storage format in accordance with one embodiment of the invention.

FIG. 2 shows a characteristic storage format in accordance with one embodiment of the invention. As shown in FIG. 2, the characteristic (114) is associated with a time-related attribute (116). In one embodiment of the invention, the time-related attribute (116) may include, but is not limited to, a version of the target system (or a project) and a timestamp. In one embodiment of the invention, if the time-related attribute (116) corresponds to a the version of the target system (or the project), then the version may correspond, but is not limited to, the version of the target system (or project) at the time the particular characteristic was created, the version of the target system (or project) at the time the characteristic was last modified, or the version of the target system (or project) at the time the characteristic was extracted from the target system and stored in the characteristics store. In one embodiment of the invention, if the time-related attribute (116) corresponds to the timestamp, then the timestamp may correspond, but is not limited to, the timestamp at the time the particular characteristic was created, the timestamp at the time the characteristic was last modified, or the timestamp at the time the characteristic was extracted from the target system and stored in the characteristics store. Those skilled in the art will appreciate that the time-related attribute for a given characteristic does not necessarily need to be stored with the characteristic (i.e., in the same table as the characteristic). Rather, the time-related attribute for a given characteristics must only be stored in the characteristics store (106) or in a location accessible by the system.

Figure 3:
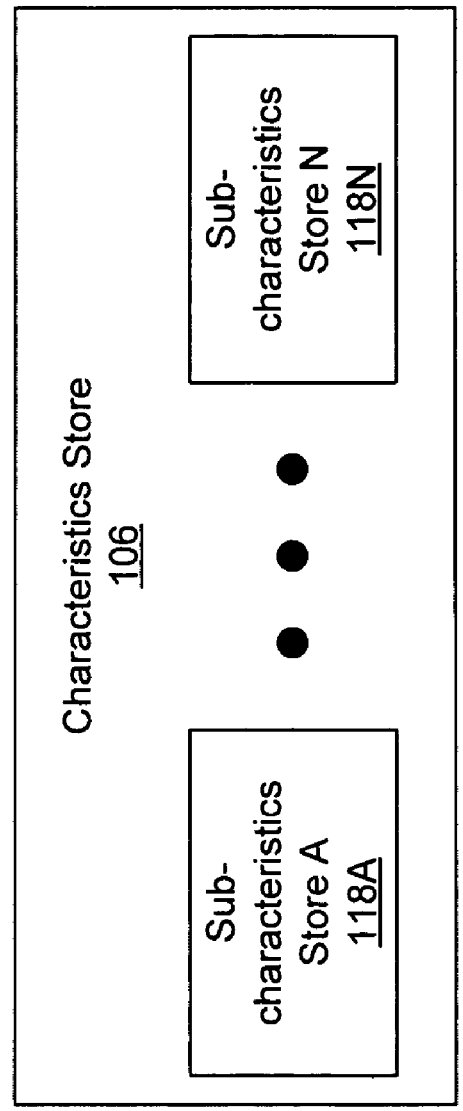
FIG. 3 shows a characteristics store in accordance with one embodiment of the invention.

FIG. 3 shows a characteristics store in accordance with one embodiment of the invention. As shown in FIG. 3, the characteristics store (106) includes a number of sub-characteristics stores (118A, 118N). In one embodiment of the invention, each sub-characteristics store (118A, 118N) includes characteristics of the target system obtained during a given timeframe, at a given time, or for a particular version of the target system. Because the sub-characteristics store (118A, 118N) are associated with a version, time, or a timeframe, there is typically no requirement to store a time-related attribute with each of the characteristics in a given sub-characteristics store (118A, 118N). In one embodiment of the invention, the timeframe corresponds to a discrete time (e.g., second, minute, hour, day, week, etc.) during which the characteristics in the particular sub-characteristics store (118A, 118N) were extracted from the target system. In one embodiment of the invention, the sub-characteristics store (118A, 118N) stores a snapshot (i.e., characteristics of the target system at a specific time). Those skilled in the art will appreciate that both tracking mechanisms may be used within a given system.

As discussed above, each characteristics model defines one or more artifacts, one or more relationships between the artifacts, and one or more characteristics for each artifact. The following is an example of a DTrace characteristics model. In the example, the DTrace characteristics model includes the following attributes: DTraceProject, Network, Computers, CPUs, Processes, Threads, Callstacks, and FunctionCalls. The DTrace characteristics model defines the following relationships between the aforementioned artifacts: DTraceProject includes one or more Networks, each Network includes one or more Computer, each Computer includes one or more CPUs, each CPU runs (includes) one or more Processes, each Process includes one or more Threads, each Thread includes one or more CallStacks, and each CallStacks includes one or more FunctionCalls.

The following characteristics are used in the DTrace characteristics model: id (i.e., unique CPU id), probeTimestamp (i.e., the performance probe timestamp), memoryCapacity (i.e., the memory available to artifact), cpuNumber (i.e., the number of this CPU in the Computer), usagePercentIO (i.e., the total IO usage percent), usagePercentCPU (i.e., the total CPUusage percent), usagePercentMemory (i.e., the total memory usage percent), usagePercentNetwork (i.e., the total network bandwidth usage percent), usagePercentIOKernel (i.e., the kernel IO usage percent), UsagePercentCPUKernel (i.e., the kernel CPUusage percent), UsagePercentMemoryKernel (i.e., the kernel memory usage percent), and usagePercentNetworkKernel (i.e., the kernel network bandwidth usage percent).

The following is a DTrace characteristics model in accordance with one embodiment of the invention.

DTrace Characteristics Model

```
1   persistent class DTraceProject {
2   Long id;
3   Timestamp probeTimestamp;
4   String name;
5   owns Network theNetworks(0,n) inverse theDTraceProject(1,1);
6   } // class DTraceProject
7
```

-continued

DTrace Characteristics Model

```
8    persistent class Computer {
9      Long id;
10     Timestamp probeTimestamp;
11     String name;
12     Long numberOfCPUs;
13     Long memoryCapacity;
14     Float usagePercentIO;
15     Float usagePercentCPU;
16     Float usagePercentMemory;
17     Float usagePercentNetwork;
18     Float usagePercentIOKernel;
19     Float usagePercentCPUKernel;
20     Float usagePercentMemoryKernel;
21     Float usagePercentNetworkKernel;
22     owns CPU theCPUs(0,n) inverse theComputer(1,1);
23   } // class Computer
24
25   persistent class CPU {
26     Long id;
27     Timestamp probeTimestamp;
28     Long cpuNumber;
29     Long memoryCapacity;
30     Float usagePercentIO;
31     Float usagePercentCPU;
32     Float usagePercentMemory;
33     Float usagePercentNetwork;
34     Float usagePercentIOKernel;
35     Float usagePercentCPUKernel;
36     Float usagePercentMemoryKernel;
37     Float usagePercentNetworkKernel;
38     owns Process theProcesss(0,n) inverse theCPU(1,1);
39   } // class CPU
40
41   persistent class Network {
42     Long id;
43     Timestamp probeTimestamp;
44     String name;
45     Long totalCapacity;
46     Float usagePercent;
47     owns Computer theComputers(0,n) inverse theNetwork(1,1);
48   } // class Network
49
50   persistent class Process {
51     Long id;
52     Timestamp probeTimestamp;
53     String name;
54     String commandLine;
55     Integer priority;
56     owns Thread theThreads(0,n) inverse theProcess(1,1);
57     references Process theProcesss(0,n) inverse theProcess(1,1);
58   } // class Process
59
60   persistent class CallStack {
61     Long id;
62     Timestamp probeTimestamp;
63     Float usagePercentIO;
64     Float usagePercentCPU;
65     Float usagePercentMemory;
66     Float usagePercentNetwork;
67     Float usagePercentIOKernel;
68     Float usagePercentCPUKernel;
69     Float usagePercentMemoryKernel;
70     Float usagePercentNetworkKernel;
71     owns FunctionCall theFunctionCalls(0,n) inverse
         theCallStack(1,1);
72   } // class CallStack
73
74   persistent class Thread {
75     Long id;
76     String name;
77     Timestamp probeTimestamp;
78     Long priority;
79     Float usagePercentIO;
80     Float usagePercentCPU;
81     Float usagePercentMemory;
82     Float usagePercentNetwork;
83     Float usagePercentIOKernel;
```

-continued

DTrace Characteristics Model

```
84     Float usagePercentCPUKernel;
85     Float usagePercentMemoryKernel;
86     Float usagePercentNetworkKernel;
87     owns CallStack theCallStacks(0,n) inverse theThread(1,1);
88   } // class Thread
89
90   persistent class FunctionCall {
91     Long id;
92     String name;
93     Timestamp probeTimestamp;
94     Float usagePercentIO;
95     Float usagePercentCPU;
96     Float usagePercentMemory;
97     Float usagePercentNetwork;
98     Float usagePercentIOKernel;
99     Float usagePercentCPUKernel;
100    Float usagePercentMemoryKernel;
101    Float usagePercentNetworkKernel;
102    references FunctionCall theFunctionCalls(0,n) inverse
         theFunctionCall(1,1);
103  } // class FunctionCall
```

In the above DTrace Characteristics Model, the DTraceProject artifact is defined in lines 1-6, the Network artifact defined in lines 41-48, the Computer artifact is defined in lines 8-23, the CPU artifact is defined in lines 25-39, the Processes artifact is defined in lines 50-58, the Thread artifact is defined in lines 74-88, the Callstacks artifact is defined in 61-72, and the FunctionCall artifacts is defined in lines 90-103.

A graphical representation of the aforementioned DTrace characteristics model is shown in FIG. 4. Specifically, the graphical representation of the DTrace characteristics model shows each of the aforementioned artifacts, characteristics associated with each of the aforementioned artifacts, and the relationships (including cardinality) among the artifacts. In particular, box (120) corresponds to the DTraceProject artifact, box (122) corresponds to the Network artifact, box (124) corresponds to the Computer artifact, box (126) corresponds to the CPU artifact, box (128) corresponds to the Process artifact, box (130) corresponds to the Thread artifact, box (132) corresponds to the CallBack artifact, and box (134) corresponds to the FunctionCall artifact.

Figure 5:
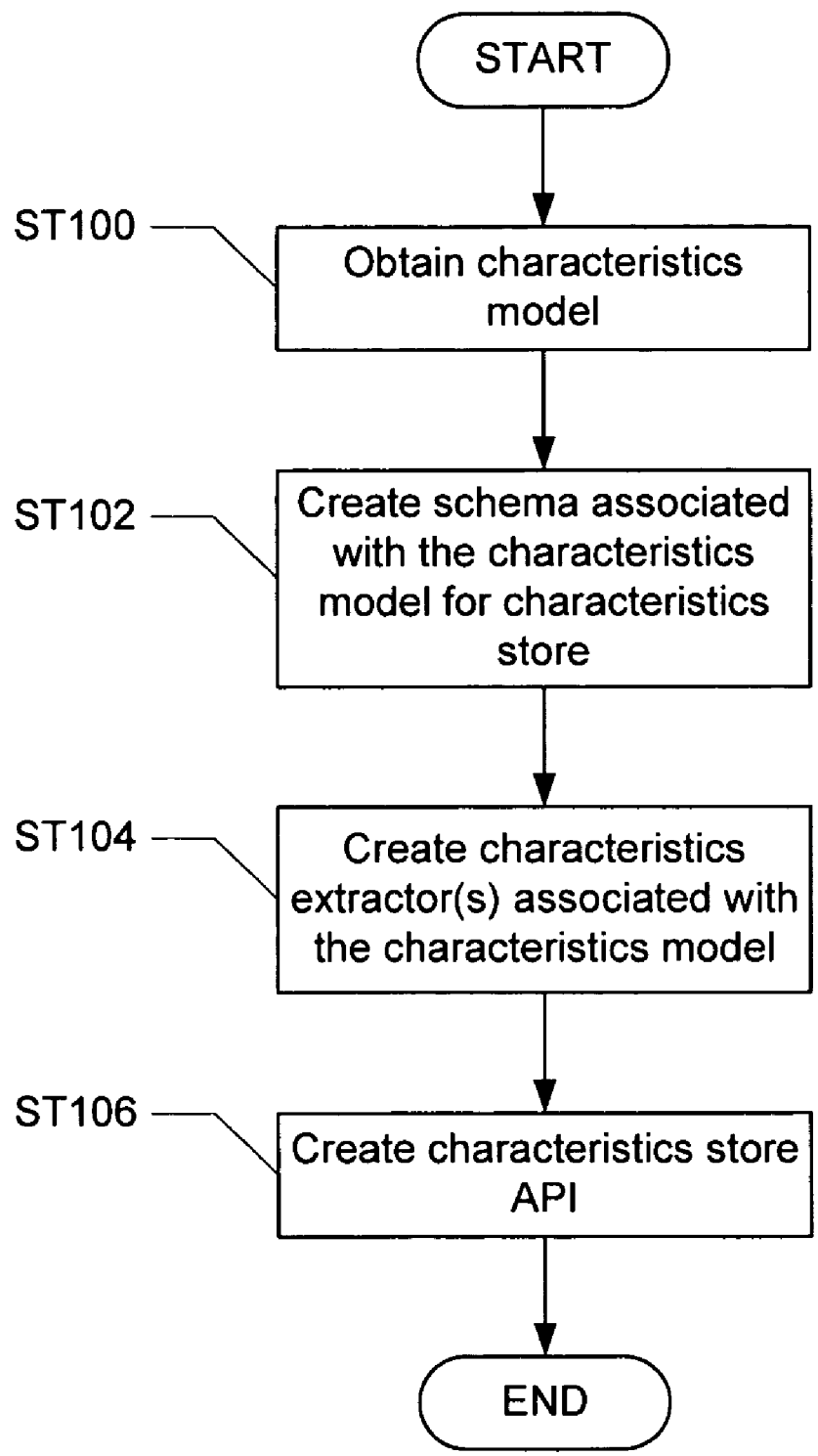
FIGS. 5 and 6 show flowcharts in accordance with one embodiment of the invention.

FIG. 5 shows a flowchart in accordance with one embodiment of the invention. Initially, a characteristics model is obtained (ST100). In one embodiment of the invention, the characteristics model is obtained from a pre-defined set of characteristics models. Alternatively, the characteristics model is customized characteristics model to analyze a specific domain in the target system and obtained from a source specified by the user.

Continuing with the discussion of FIG. 5, a schema for the characteristics store is subsequently created and associated with characteristics model (ST102). One or more characteristics extractors associated with characteristics model are subsequently created (ST104). Finally, a characteristics store API is created (ST106). In one embodiment of the invention, creating the characteristics store API includes creating a mapping between characteristics obtained by the characteristics extractors and tables defined by the schema configured to store the characteristics in the characteristics store.

Those skilled in the art will appreciate that ST100-ST106 may be repeated for each characteristics model. In addition, those skilled in the art will appreciate that once a characteristics store API is created, the characteristics store API may only need to be modified to support additional schemas in the characteristics data store and additional characteristics extractors. Alternatively, each characteristics model may be associated with a different characteristics store API. Those skilled in the art will appreciate that a determination may be made during the setup of the system as to the tracking mechanism to use. Once the tracking mechanism is selected, the appropriate modifications are made to the system. These changes may include modifications to the characteristics store API(s) to store the extracted characteristics in the appropriate sub-characteristics store, modifications to the characteristics extractors to extract additional information from the target system (e.g., time-related attribute information or information used to determine the particular sub-characteristics store a particular characteristic is to be stored), changes to the schema (as well as the underlying implementation in the characteristics store) to support the storage of time-related attributes and/or sub-characteristics stores.

Figure 6:
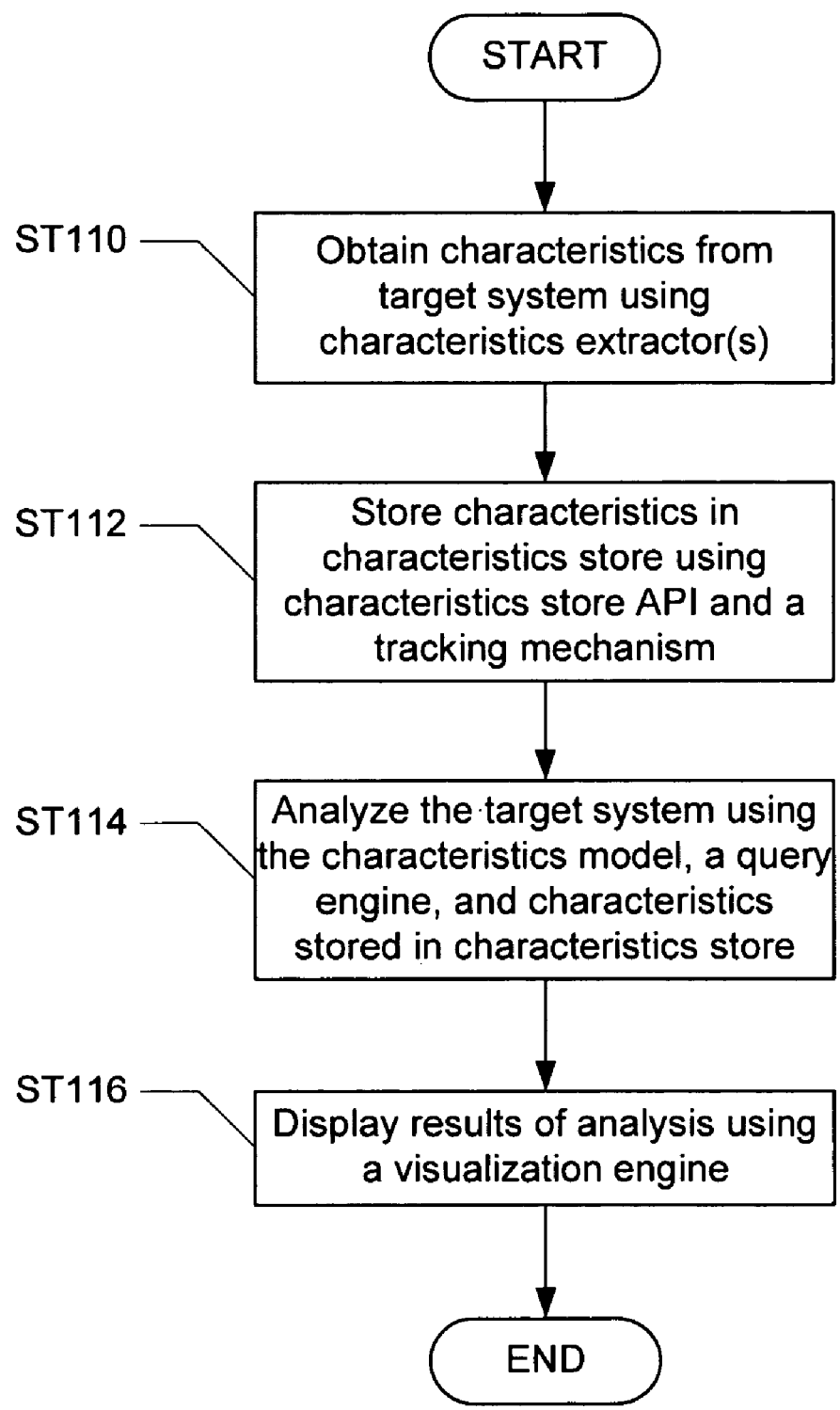

At this stage, the system is ready to analyze a target system. FIG. 6 shows a flowchart in accordance with one embodiment of the invention. Initially, characteristics are obtained from the target system using one or more characteristics extractors (ST110). In one embodiment of the invention, the characteristics extractors associated with a given characteristics model only obtain information about characteristics associated with the artifacts defined in the characteristics model.

Continuing with the discussion of FIG. 6, the characteristics obtained from the target system using the characteristics extractors are stored in the characteristics store using the characteristics store API and a tracking mechanism (ST112). Depending on the tracking mechanism, the characteristics extracted from the target system may be stored in the appropriate sub-characteristics store and/or with a time-related attribute. Those skilled in the art will appreciate that the characteristics extractors will include functionality to obtain the necessary information (e.g., time, timestamp, version, etc.) as required by the tracking mechanism.

Continuing with the discussion of FIG. 6, once the characteristics are stored in the characteristics store, the target system may be analyzed using the characteristics model (or models), a query engine, and the characteristics stored in the characteristics store (ST114). In one embodiment of the invention, the user uses the query engine to issue queries to characteristics store. As discussed above, the query engine may include information (or have access to information) about the characteristics models currently being used to analyze the target system. In addition, the query may use the tracking information associated with the tracking mechanisms to track changes in the target system. The results of the analysis are subsequently displayed using a visualization engine (ST116).

Those skilled in the art will appreciate that ST110-ST112 may be performed concurrently with ST114-ST116. In addition, steps in FIG. 5, may be performed concurrently with the steps in FIG. 6.

As discussed above, the query engine may issue queries that use the tracking information to analyze changes within the target system. More specifically, the query engine may issue queries that use the time-related attributes or the sub-characteristics stores to track the changes within the target system. The following are two examples of queries that use the time-related attribute to track changes within the target system:

EXAMPLE 1

Query using Time-Related Attribute

SELECT c.name FROM JClass c WHERE c.system.time_stamp > '2005-04-01 10:00'

The above query is used to determine all Java™ classes added to the system since 2005-04-01 10:00.

EXAMPLE 2

Query using Time-Related Attribute

SELECT c.name FROM JClass c WHERE c.system.version > '5.1'

The above query is used to determine all Java™ classes added to the system since version 5.1.

The following is an example of a query that uses the sub-characteristics stores to track changes within the target system:

EXAMPLE 3

Query using Sub-Characteristics Stores

SELECT c.name FROM classes branch1.c
WHERE (c instanceof "javax.servlet.http.HttpServlet"
    OR c instanceof "javax.servlet.http.GenericServlet")
  AND branch1.c NOT IN
    (SELECT c.name FROM classes branch2.c
     WHERE c instanceof "javax.servlet.http.HttpServlet"
        OR c instanceof "javax.servlet.http.GenericServlet")

The above query is used to determine all servlets that are in sub-characteristics store 2 (denoted as branch1 in the query) and not in sub-characteristics store 1 (denoted as branch2 in the query). Thus, the above query may be used to determine which servlets were added to the target system between the time sub-characteristics store 1 was populated and the time the sub-characteristics store 2 was populated.

Figure 7:
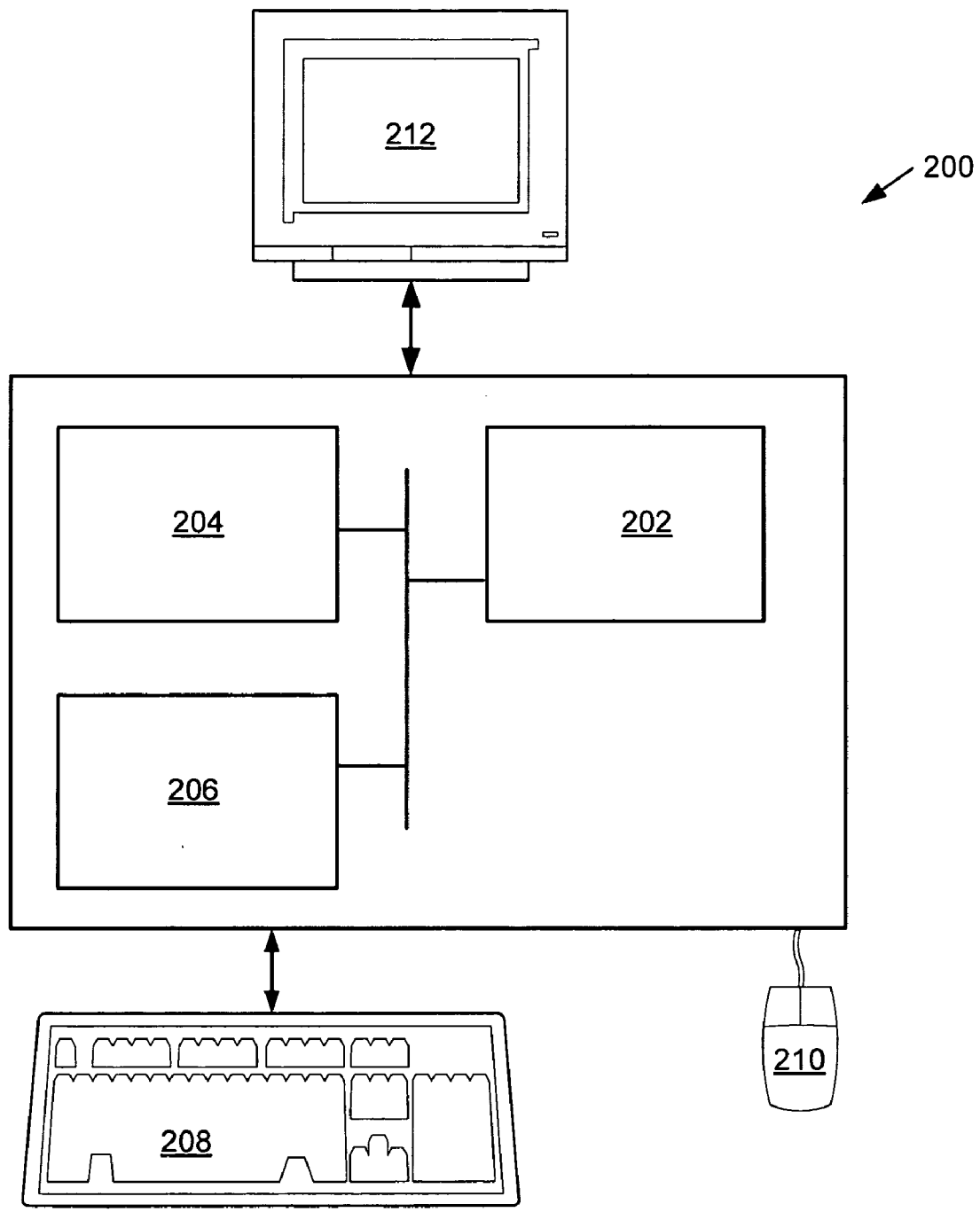
FIG. 7 shows a computer system in accordance with one embodiment of the invention.

An embodiment of the invention may be implemented on virtually any type of computer regardless of the platform being used. For example, as shown in FIG. 7, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a tangible computer readable medium such as a compact disc (CD), a diskette, a tape, or any other tangible computer readable storage device.

While the invention has been described with respect to a limited number of embodiments, those skilled in the art, having benefit of this discloser, will appreciated that other embodiments can be devised which do not depart from the scope of the invention as disclosed herein. According, the scope of the invention should be limited only by the attached claims.

What is claimed is:

1. A method for analyzing a target system, comprising:
    obtaining a characteristics model;
    generating a characteristics extractor associated with the characteristics model;
    obtaining a plurality of characteristics from the target system using the characteristics extractor, wherein the plurality of characteristics is associated with the characteristics model configured to define each of the plurality of characteristics in a particular domain, wherein the particular domain corresponds to a grouping of related characteristics, and wherein the particular domain comprises at least one hardware component and at least one software component, wherein there is a relationship between the at least one hardware and software components;
    storing each of the plurality of characteristics in a characteristics store using a tracking mechanism configured to track changes to target system characteristics in the particular domain over time;
    generating a characteristics store application programming interface (API) associated with the characteristics model, wherein the characteristics extractor uses the characteristics store API to store each of the plurality of characteristics in the characteristics store;
    analyzing the target system in the particular domain by issuing a query to the characteristics store to obtain an analysis result, wherein the query uses tracking information associated with the tracking mechanism; and
    displaying the analysis result on a display associated with a computing device.

2. The method of claim 1, wherein the tracking mechanism comprises storing a time-based attribute associated with each of the plurality of characteristics in the characteristics store.

3. The method of claim 2, wherein the time-based attribute comprises at least one selected from the group consisting of a timestamp and a target system version number.

4. The method of claim 1, wherein the characteristics store comprises a first sub-characteristics store and a second sub-characteristics store.

5. The method of claim 4, wherein the tracking mechanism comprises storing characteristics associated with a first timeframe in the first sub-characteristics store and storing characteristics associated with a second timeframe in the second sub-characteristics store.

6. The method of claim 4, wherein the tracking mechanism comprises storing characteristics associated with a first version of the target system in the first sub-characteristics store and storing characteristics associated with a second version of the target system in the second sub-characteristics store.

7. The method of claim 1, wherein the tracking information comprises one selected from the group consisting of a time-related attribute and a sub-characteristics store name.

8. The method of claim 1, wherein the at least one query is defined using a pattern query language and wherein the pattern query language includes functionality to search for at least one pattern in the target system.

9. A computer system, comprising:
    a processor;
    a characteristics model defining at least one artifact and a plurality of characteristics associated with the at least one artifact for a particular domain, wherein the particular domain corresponds to a grouping of related artifacts, and wherein the particular domain comprises at least one hardware component and at least one software component, wherein there is a relationship between the at least one hardware and software components;
    a target system comprising at least one of the plurality of characteristics defined in the characteristics model;
    at least one characteristics extractor associated with the characteristics model and configured to obtain at least one of the plurality of characteristics from the target system;
    a characteristics store configured to store the at least one of the plurality of characteristics obtained from the target system using a tracking mechanism configured to track changes to target system artifacts in the particular domain over time;
    a characteristics store application programming interface (API) associated with the characteristics model, wherein the characteristics extractor uses the characteristics store API to store each of the plurality of characteristics in the characteristics store; and
    a query engine executed by the processor and configured to analyze the target system in the particular domain by issuing a query to the characteristics store and configured to obtain an analysis result in response to the at least one query, wherein the query uses tracking information associated with the tracking mechanism.

10. The computer system of claim 9, wherein the tracking mechanism comprises storing a time-based attribute associated with each of the plurality of characteristics in the characteristics store.

11. The computer system of claim 10, wherein the time-based attribute comprises at least one selected from the group consisting of a timestamp and a target system version number.

12. The computer system of claim 9, wherein the characteristics store comprises a first sub-characteristics store and a second sub-characteristics store.

13. The computer system of claim 12, wherein the tracking mechanism comprises storing characteristics associated with a first timeframe in the first sub-characteristics store and storing characteristics associated with a second timeframe in the second sub-characteristics store.

14. The computer system of claim 12, wherein the tracking mechanism comprises storing characteristics associated with a first version of the target system in the first sub-characteristics store and storing characteristics associated with a second version of the target system in the second sub-characteristics store.

15. The computer system of claim 9, wherein the tracking information comprises one selected from the group consisting of a time-related attribute and a sub-characteristics store name.

16. The computer system of claim 9, wherein the at least one query is defined using a pattern query language, wherein the pattern query language includes functionality to search for at least one pattern in the target system.

17. A computer readable storage medium comprising software instructions for analyzing a target system, having software instructions stored thereon that, when executed by a processor, are configured to:
    obtaining a characteristics model;

generating a characteristics extractor associated with the characteristics model;

obtain a plurality of characteristics from the target system using the characteristics extractor, wherein the plurality of characteristics is associated with the characteristics model configured to define each of the plurality of characteristics in a particular domain, wherein the particular domain corresponds to a grouping of related characteristics, and wherein the particular domain comprises at least one hardware component and at least one software component, wherein there is a relationship between the at least one hardware and software components;

store each of the plurality of characteristics in a characteristics store using a tracking mechanism configured to track changes to target system characteristics in the particular domain over time;

generating a characteristics store application programming interface (API) associated with the characteristics model, wherein the characteristics extractor uses the characteristics store API to store each of the plurality of characteristics in the characteristics store; and analyze the target system in the particular domain by issuing a query to the characteristics store to obtain an analysis result, wherein the query uses tracking information associated with the tracking mechanism.

18. The computer readable storage medium of claim 17, wherein the tracking mechanism comprises storing a time-based attribute associated with each of the plurality of characteristics in the characteristics store.

19. The computer readable storage medium of claim 18, wherein the time-based attribute comprises at least one selected from the group consisting of a timestamp and a target system version number.

20. The computer readable storage medium of claim 17, wherein the characteristics store comprises a first sub-characteristics store and a second sub-characteristics store.

21. The computer readable storage medium of claim 20, wherein the tracking mechanism comprises storing characteristics associated with a first timeframe in the first sub-characteristics store and storing characteristics associated with a second timeframe in the second sub-characteristics store.

22. The computer readable storage medium of claim 20, wherein the tracking mechanism comprises storing characteristics associated with a first version of the target system in the first sub-characteristics store and storing characteristics associated with a second version of the target system in the second sub-characteristics store.

23. The computer readable storage medium of claim 17, wherein the tracking information comprises one selected from the group consisting of a time-related attribute and a sub-characteristics store name.

* * * * *

UNITED STATES PATENT AND TRADEMARK OFFICE
CERTIFICATE OF CORRECTION

| | | |
|---|---|---|
| PATENT NO. | : 7,703,074 B2 | |
| APPLICATION NO. | : 11/133831 | |
| DATED | : April 20, 2010 | |
| INVENTOR(S) | : Yury Kamen et al. | |

It is certified that error appears in the above-identified patent and that said Letters Patent is hereby corrected as shown below:

Title page 2, in column 1, under "Other Publications", line 6, delete "componet" and insert -- component --, therefor.

Title page 2, in column 1, under "Other Publications", line 11, delete "fo rimage" and insert -- for image --, therefor.

In column 13, line 6, delete "discloser," and insert -- disclosure, --, therefor.

In column 13, line 6, delete "appreciated" and insert -- appreciate --, therefor.

In column 13, line 8, delete "According," and insert -- Accordingly, --, therefor.

Signed and Sealed this
Nineteenth Day of April, 2011

David J. Kappos
*Director of the United States Patent and Trademark Office*